(12) United States Patent
Ramchetty et al.

(10) Patent No.: US 9,135,443 B2
(45) Date of Patent: Sep. 15, 2015

(54) IDENTIFYING MALICIOUS THREADS

(75) Inventors: Harinath Vishwanath Ramchetty, Karnataka (IN); Aditya Kapoor, Beaverton, OR (US); Babu Nath Giri, Karnataka (IN)

(73) Assignee: McAfee, Inc., Santa Clara, CA (US)

( * ) Notice: Subject to any disclaimer, the term of this patent is extended or adjusted under 35 U.S.C. 154(b) by 913 days.

(21) Appl. No.: 12/774,870

(22) Filed: May 6, 2010

(65) Prior Publication Data
US 2011/0277033 A1 Nov. 10, 2011

(51) Int. Cl.
*G06F 21/00* (2013.01)
*G06F 21/56* (2013.01)

(52) U.S. Cl.
CPC ............ *G06F 21/566* (2013.01); *G06F 21/564* (2013.01)

(58) Field of Classification Search
CPC ...... G06F 21/78; G06F 21/564; G06F 21/566
USPC ................... 726/1, 10, 22–30; 713/164–167; 709/205, 223–225; 705/38; 370/328
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,398,553 B1 * | 7/2008 | Li | 726/22 |
| 7,506,155 B1 | 3/2009 | Stewart et al. | |
| 7,840,763 B2 * | 11/2010 | Murotake et al. | 711/153 |
| 8,312,537 B1 * | 11/2012 | Nachenberg et al. | 726/22 |
| 2006/0230388 A1 * | 10/2006 | Hatlelid et al. | 717/127 |
| 2006/0265749 A1 * | 11/2006 | Kwon et al. | 726/24 |
| 2008/0060075 A1 * | 3/2008 | Cox et al. | 726/24 |
| 2009/0199297 A1 * | 8/2009 | Jarrett et al. | 726/24 |
| 2009/0282476 A1 * | 11/2009 | Nachenberg et al. | 726/22 |
| 2011/0173698 A1 * | 7/2011 | Polyakov et al. | 726/23 |

OTHER PUBLICATIONS

Paruj Ratanaworabhan et al., NOZZLE: A Defense Against Heap-spraying Code Injection Attacks, 2009, USENIX, pp. 1-18.*
Akira Mor et al., A Tool for Analyzing and Detecting Malicious Mobile Code, May 20-28, 2006, ACM, pp. 831-834.*
Eric Uday Kumar, Applying User-Mode Memory Scanning on Windows NT, Oct. 2008, EUKumar, pp. 1-8.*
Andreas Schuster, Searching for processes and threads in Microsoft Windows memory dumps, Sep. 2006, ScienceDirect, vol. 3, pp. 10-16.*

* cited by examiner

*Primary Examiner* — Bradley Holder
*Assistant Examiner* — Fahimeh Mohammadi
(74) *Attorney, Agent, or Firm* — Patent Capital Group (57) ABSTRACT

Methods, systems, and apparatus, including computer programs encoded on a computer storage medium, for identifying and processing malicious threads In one aspect, a method includes identifying a memory heap block; identifying threads that reside in the memory heap block; determining whether at least one of the identified threads in the memory heap block is a malicious thread; and in response to determining that at least one of the identified threads is a malicious thread, terminating each of the identified threads.

7 Claims, 5 Drawing Sheets

IDENTIFYING MALICIOUS THREADS

BACKGROUND

This specification relates to malware protection software.

Malware is any kind of malicious software such as, for example, a computer virus, Trojan horse, spyware, and malicious active content. Malware can spread via infected email attachments, shared files, or malicious websites. Malware can also spread inconspicuously via link files that cause malicious activities to be performed, such as downloading malware.

Malware can attach to files so that when the infected file executes, the malware also execute and, for example, self-replicates without the user's knowledge or permission. Other malware target a computer's memory and infect files as the computer opens, modifies, or creates files. Some malware can lie dormant and not show any signs of existence, e.g., key capture software, monitoring software, etc. Some malware executes as threads within otherwise legitimate computer processes.

Malware protection software generally operates by scanning a computer's memory and disk drives for malicious code. Scanning may be performed by comparing signatures of files with signatures of known malware. Once identified, the malware may be removed. However, some malware is capable of re-infecting a computer so long as a malware process or thread is executing.

SUMMARY

This specification describes technologies relating to identifying malicious threads. As used herein, a malicious thread is any thread of execution that is a part of a malicious software process. In general, one innovative aspect of the subject matter described in this specification can be embodied in methods that include the actions of identifying a memory heap block; identifying threads that reside in the memory heap block; determining whether at least one of the identified threads in the memory heap block is a malicious thread; and in response to determining that at least one of the identified threads is a malicious thread, terminating each of the identified threads.

In general, another innovative aspect of the subject matter described in this specification can be embodied in methods that include the actions of identifying memory segments associated with processes executing on a data processing apparatus; identifying one or more threads executing within the processes, each thread residing in a memory segment of the memory segments; determining that a first memory segment in the one or more memory segments includes a signature of a malicious thread; in response to determining the first memory segment includes the signature of a malicious thread, identifying all threads residing in the first memory segment as malicious threads; and terminating the threads marked as malicious threads.

These and other embodiments may optionally include one or more of the following features. Identifying threads that reside in the memory heap block may include identifying threads which have a start address within an address range of the memory heap block. Determining whether at least one of the identified threads in the memory heap block is a malicious thread may include analyzing only identified threads residing in the memory heap block for the presence of malicious threads. Analyzing only the identified threads for the presence of malicious threads may include identifying a signature for a thread; and comparing the signature for the thread to signatures of known malicious threads. Determining whether at least one of the identified threads in the memory heap block is a malicious thread may include determining that the signature for the thread matches one of the signatures of known malicious threads. Determining whether at least one of the identified threads in the memory heap block is a malicious thread may include processing the memory heap block for thread signatures of known malicious threads. Determining whether at least one of the identified threads in the memory heap block is a malicious thread may include determining that the signature for the thread matches one of the signatures of known malicious threads. Determining whether at least one of the identified threads in the memory heap block is a malicious thread may include analyzing the memory heap block for the presence of malicious threads only in response to determining that at least one of the threads resides in the memory heap block. Analyzing the memory heap block for the presence of malicious threads may include processing the memory heap block for thread signatures of known malicious threads. Determining whether at least one of the identified threads in the memory heap block is a malicious thread may include determining that memory heap block includes a thread signature that matches one of the signatures of known malicious threads. Each memory segment may be a memory heap block. Determining the first memory segment includes the signature of a malicious thread may include receiving signatures being indicative of malicious threads. Determining that at least one of the received signatures matches a signature in the first memory segment. Determining a memory segment is a clean memory segment in the one or more memory segments. In response to determining the memory segment is a clean memory segment, marking threads associated with the clean memory segment as processed.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Malicious thread(s) running in legitimate processes may be terminated allowing the malware to be effectively removed. Malicious thread(s) may be terminated without affecting the legitimate computer processes. Malicious thread(s) may be identified reliably, and false positives may be minimized. Memory may be searched rapidly for malicious threads, as the memory is, in some implementations, search according to heap blocks, and malicious threads are processed when they are identified in heap blocks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
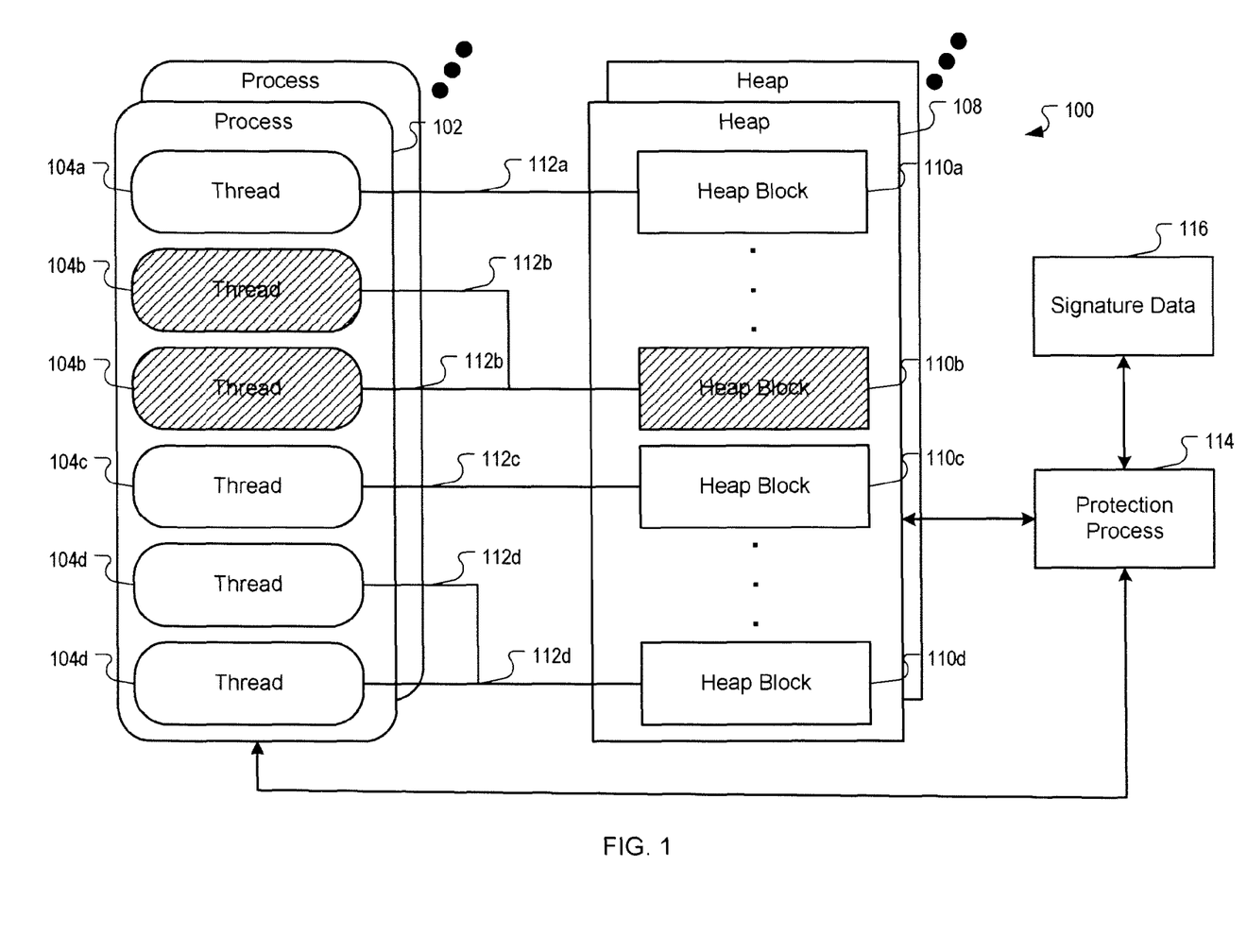
FIG. 1 is a block diagram showing how a malware program may infiltrate an existing process by manipulating its threads and memory heap.

FIG. 1 is a block diagram showing how a malware program may infiltrate an existing computer process by manipulating its threads and memory heap. A computer process is a program that executes on a computer. The computer process can be a background process, such as a spell checker or system event handler. A computer process may also be a user application, such as a word processing program.

In order to stay memory resident and conceal its identity, many malware actively 'run' in other process context instead of creating its own process. To achieve this, malware copies its portion or complete code into already running process(es) and creates one or multiple thread(s) in the target process to execute the copied code.

As shown in FIG. 1, threads 104a-d are executed in the context of a computer process 102. Each thread executes code comprising a series of instructions using the computers processor and other resources, for example, disk drives. A thread enables parallel processing to occur within the process 102. Each thread executes approximately simultaneously, either by executing on a separate processor or through a scheduling scheme, such as time-division multiplexing. Threads within a computer process typically share a common memory space and other resources allocated to the computer process.

The computer process 102 is also associated with a memory heap 108. The memory heap 108 stores instructions used in the operation of the computer process. For example, the instructions executed by the computer processes threads are stored in the heap of the computer process. The memory heap 108 is divided into memory heap blocks 110a-d. While the instructions for any given thread may exist across multiple memory heap blocks, the starting or initial instruction for the thread exists in only one memory heap block. A thread is said to reside in the memory heap block in which the thread's initial instruction is located. In other words, a thread resides in a memory heap block if the thread has a corresponding start address located in the memory heap block. For example, each of the threads 104a-d respectively reside in the heap blocks 110a-c, as indicated by the lines 112a-d connecting the threads 104a-d to the memory heap blocks 110a-d.

A malware program infects the computer process 102 by adding a malicious memory heap block 110b, as indicated by the shaded pattern, into the computer process' heap 108. The malware then starts malicious threads 104b that execute instructions written in the malicious memory heap block 110b. Malicious threads in a computer process may act to perpetuate the malware infection. For example, the malicious threads may hold an open handle to a malware executable, preventing it from being deleted. The malicious threads may also monitor for the presence of an infected executable and if the executable is removed, recreate it. The malicious threads may also monitor its registry entries and recreate them if removed.

A protection process 114 identifies and terminates malicious threads 104b. In general, the protection process scans processing executing on a computer system. Successful identification and removal of malware is aided by the identification and termination of these malicious threads. The malicious memory heap block may be identified by analysis techniques, for example, comparing threads and memory heap blocks with malware signatures data 116. Malware signature data 116 may be received from an external computer process or data store.

A signature is a data pattern—often a simple string of characters or bytes—that can be used to identify a particular file, computer process, or other electronic data. For example, the memory heap block may be analyzed to detect specific byte sequences in multiple places within the memory heap block. Other examples of signatures include hashes of the memory heap block or hashes of portions of the memory heap block. If a thread or memory contains the data pattern in the signature then the thread or memory may be said to match the signature.

A signature may also identify suspicious operations indicative of a known exploit instead of a specific malware program. For example, sequences of instructions (or operations being performed) to access a file "library.dll" not associated with a known clean process (e.g., a browser application) can be a signature indicative of a malware process, because "library.dll" is a DLL from an internet browsing software that is known to be exploited by malware.

Once a malicious memory thread or heap block matching a malware signature has been identified (for example, heap block 110b) all the threads that reside in the heap block (for example, threads 104b) are identified as malicious.

Described below are several embodiments that illustrate different approaches to the identification and removal of malicious threads.

Figure 2:
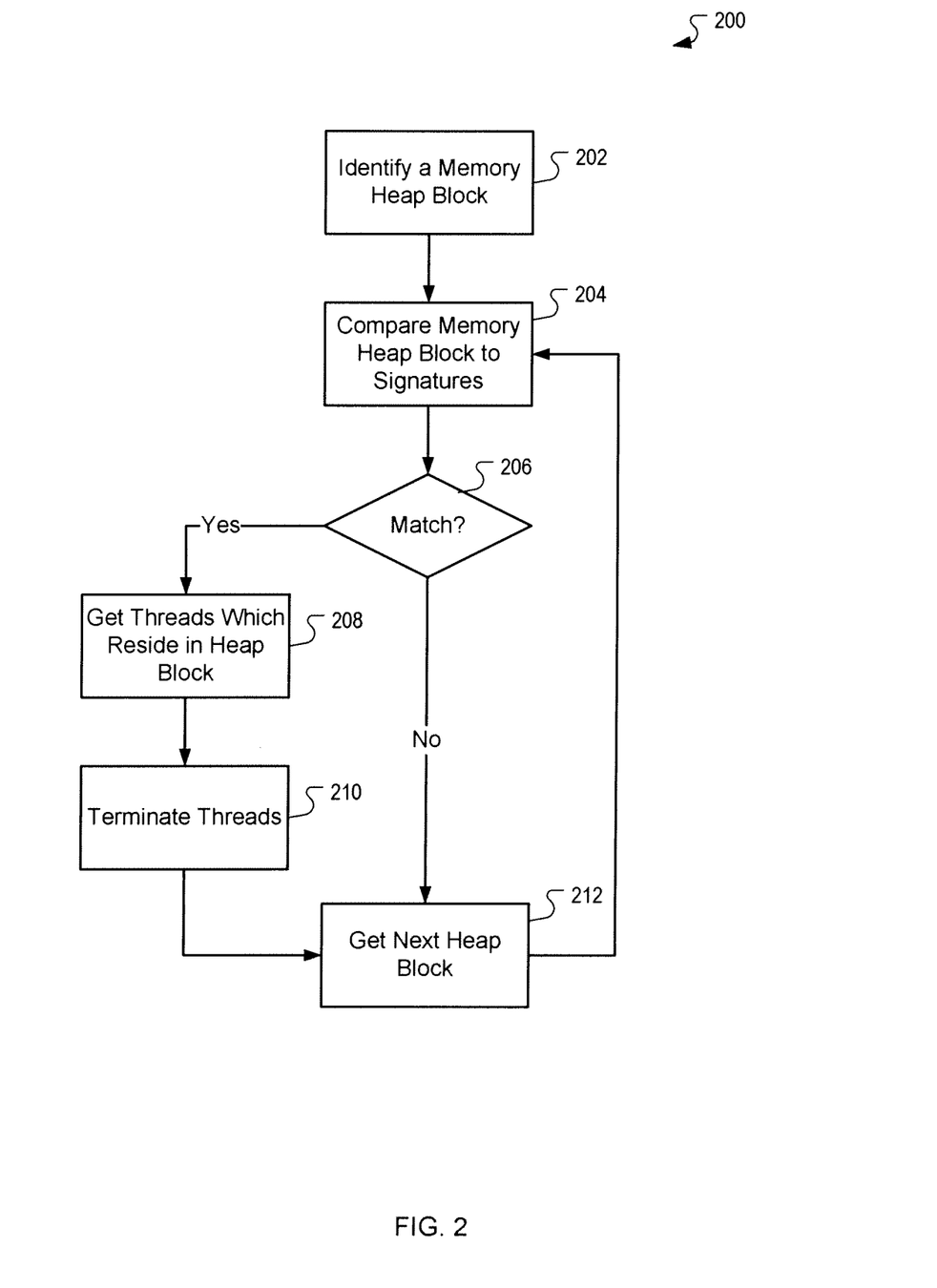
FIG. 2 is a flow diagram illustrating an example process for identifying and terminating malicious threads in a computer process.

FIG. 2 is a flow diagram illustrating an example process 200 for identifying and terminating malicious threads in a computer process. The example process 200 can be implemented in a malware protection program, e.g., antivirus software, or embodied in software code that runs independently as a separate program with its own computer processes, services, and resources.

As shown in FIG. 2, the process 200 identifies and terminates the execution of a malicious thread by processing each of the memory heap blocks to identify a signature of a malicious thread. The process identifies a memory heap block (202). For example, the process 200 begins by obtaining the memory location of the first memory heap block in the heap memory associated with a computer process.

The process 200 compares the memory heap block to signatures (204). For example, once the memory heap block is obtained the memory heap block is compared to malware signatures (for example, the signature data 116 in FIG. 1).

In some embodiments, signature detection may involve multiple memory heap blocks. For example, part of the signature may be located in the first memory heap block and the remainder of the signature may be detected in other memory heap blocks. A signature may be targeted to a specific piece of malware, or to a class of malware.

The process 200 determines if the memory heap block matches any malware signature (206). If the memory heap block includes data that matches a malware signature, the process 200 obtains the threads which reside in memory range of the identified memory heap block (208). The thread(s) start address(es) may be obtained by enumerating all the threads of the process being scanned. The start address of each thread is then compared with the address range of identified memory heap block. The thread resides in the memory heap block if the start address of the thread is within the address range of the identified memory heap block.

After (208), the process 200 terminates the malicious threads (210). Threads that have a start address within a memory heap block that matches a signature are considered malicious. The signature is indicative of a memory heap block which was added into the computer process by a malware program, and not part of the intended computer program. Any thread which originates from that memory heap block is thus considered to not be part of the native computer process but instead part of the malware infection. These threads may be safely terminated. The malicious threads are terminated to prevent the threads from carrying out any further instructions.

The next memory heap block in the computer process's heap space is obtained (212) and processed. The process 200 continues until all of the memory heap blocks in the computer process's heap have been analyzed.

Figure 3:
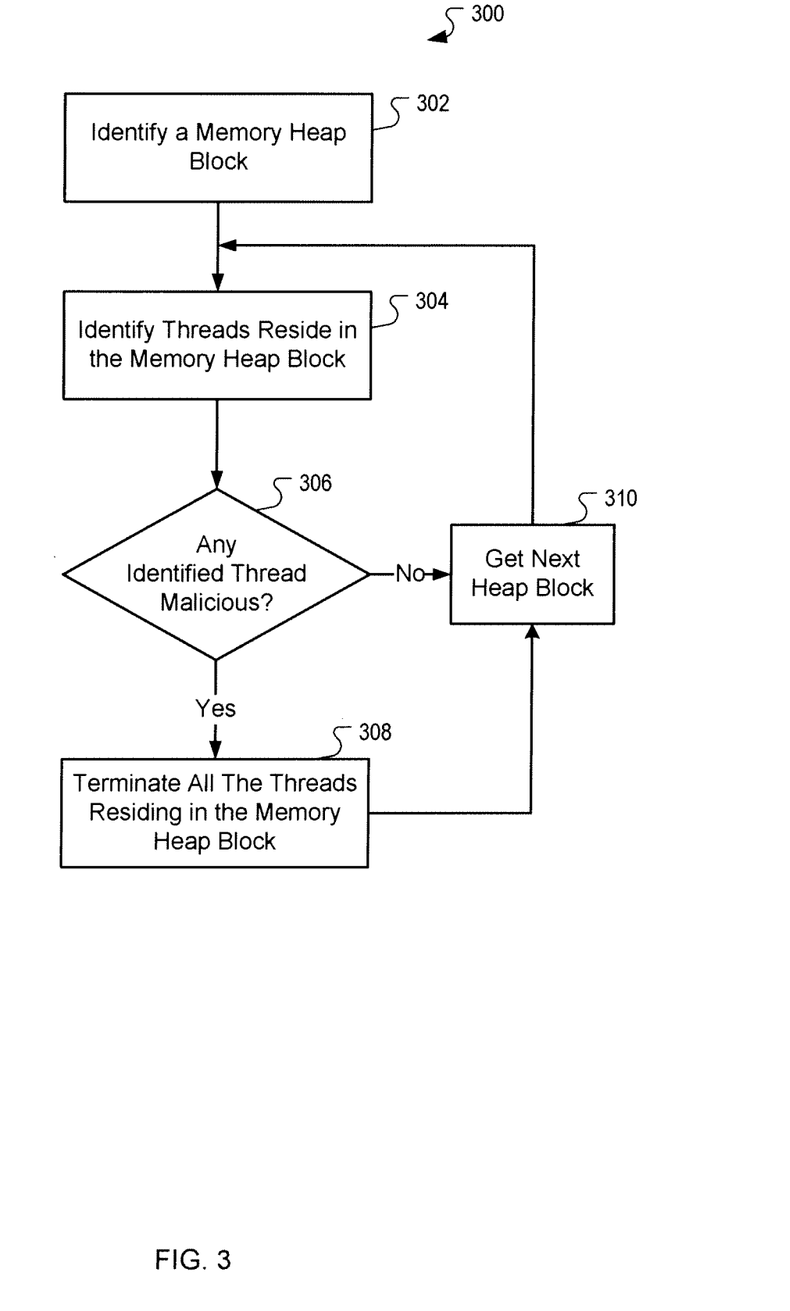
FIG. 3 is a flow diagram illustrating another example process for identifying and terminating malicious threads in a computer process.

FIG. 3 is a flow diagram illustrating another example process for identifying and terminating malicious threads in a computer process. The example process 300 can be implemented in a malware protection program, e.g., antivirus software, or embodied in software code that runs independently as a separate program with its own computer processes, services, and resources.

The process 300 identifies a memory heap block (302). The memory heap block identification may be part of a systematic examination of the system, and/or may be the result of an triggered selection, e.g., the memory heap block may have been identified because of suspicious activity related to the memory heap block.

The process 300 identifies threads that reside in the memory heap block (304). A thread resides in the memory heap block if the thread has a corresponding start address located in the memory heap block. The thread(s) start address(es) may be obtained by enumerating all the threads of the process being scanned. The start address of each thread is then compared to check if it resides within the address range of the identified memory heap block.

The process 300 determines if any malicious threads are identified (306). In one embodiment, identifying malicious threads may include determining whether at least one of the threads in the memory heap block is a malicious thread. In some embodiments, only threads which reside in the memory heap block are analyzed to determine is the thread is malicious.

Malicious threads may be identified by checking threads against a signature. In one embodiment, threads are determined to be malicious by comparing the thread to a signature of known malicious threads. Signatures may be applied to the threads sequentially. Analyzing a thread may include identifying a signature for the thread and comparing the signature of the thread to signatures of known malicious threads. The thread is considered malicious is the signature of the thread matches the signature of the known malicious thread. In another embodiment, the thread is compared to multiple signatures, each signature identifying a known malicious thread. The thread is considered malicious if any of the signatures of known malicious threads matches the thread. In another embodiment, the memory heap block is compared to signatures of known malicious threads. In another embodiment, a memory heap block is compared to signatures only in response to determining that at least one of the threads resides in the memory heap block. The threads which reside in the memory heap block are considered malicious if any of the signatures matches the memory heap block.

Malicious threads may also be identified by analyzing the operations of the thread. These operations may be analyzed for suspicious behavior or for a known sequence of operations which reveal that the thread is malicious. The operations do not need to be located within the identified memory heap block, but can be in any part of the memory where the thread's operations are stored.

If the process 300 determines that any of the threads residing in the identified memory heap block are malicious, then all of the threads associated with the identified memory heap block are considered malicious, and the process 300 terminates all the threads residing in the memory heap block (308). In response to determining that at least one of the identified threads is a malicious thread, each of the malicious threads are terminated, preventing them from performing any further activities.

The next memory heap block in the computer process's heap space is obtained (310) and processed. The process 300 continues until all of the memory heap blocks in the computer process's heap have been analyzed.

Figure 4:
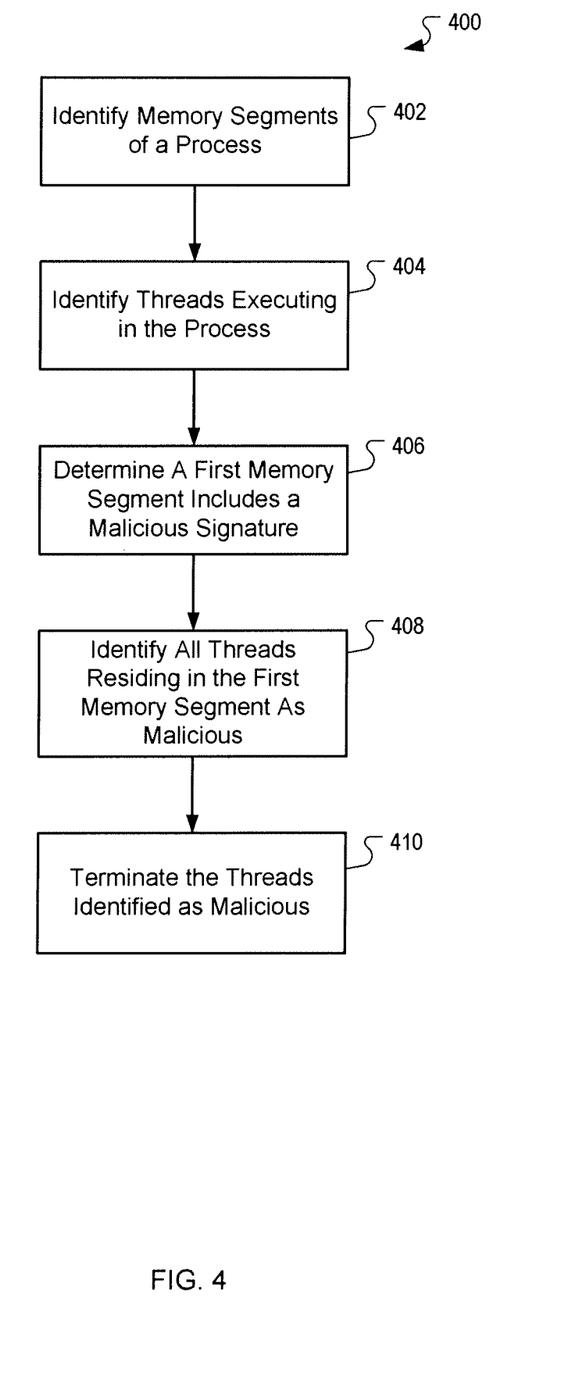
FIG. 4 is a flow diagram illustrating another example process for identifying and terminating malicious threads in a computer process.

FIG. 4 is a flow diagram illustrating another example process 400 for identifying and terminating malicious threads in a computer process. The example process 400 can be implemented in a malware protection program, e.g., antivirus software, or embodied in software code that runs independently as a separate program with its own computer processes, services, and resources.

The process 400 identifies a memory segment of a process (402). A memory segment may be a memory heap block or some other division of memory, for example, a portion of a memory heap block or a memory page. Generally, each computer process executing on a computer is assigned memory. The memory is divided into smaller memory segments, for example, memory heap blocks and memory pages. Identifying the memory assigned to the computer process may be accomplished by querying an operating system running on the computer.

The process 400 identifies threads executing in the computer process (404). The process identifies all the threads are within the computer process. Threads may be identified by querying the computer system on which the process is running.

The process 400 determines that the identified memory segment includes a malicious signature (406). In one embodiment, the identified memory segment is compared to malicious signatures to determining if the malicious signature matches the memory segment.

The process 400 identifies all threads residing in the first memory segment as malicious (408). When a memory segment matches includes data matching a malicious signature, all of the threads which reside within the memory segment are identified as malicious.

The process 400 terminates the threads identified as malicious (410). In some embodiments, all the threads may be identified as malicious or non-malicious prior to terminating any malicious threads. In some embodiments, the threads may be suspended prior to being terminated. In some embodiments, the threads may be suspended instead of the being terminated.

Figure 5:
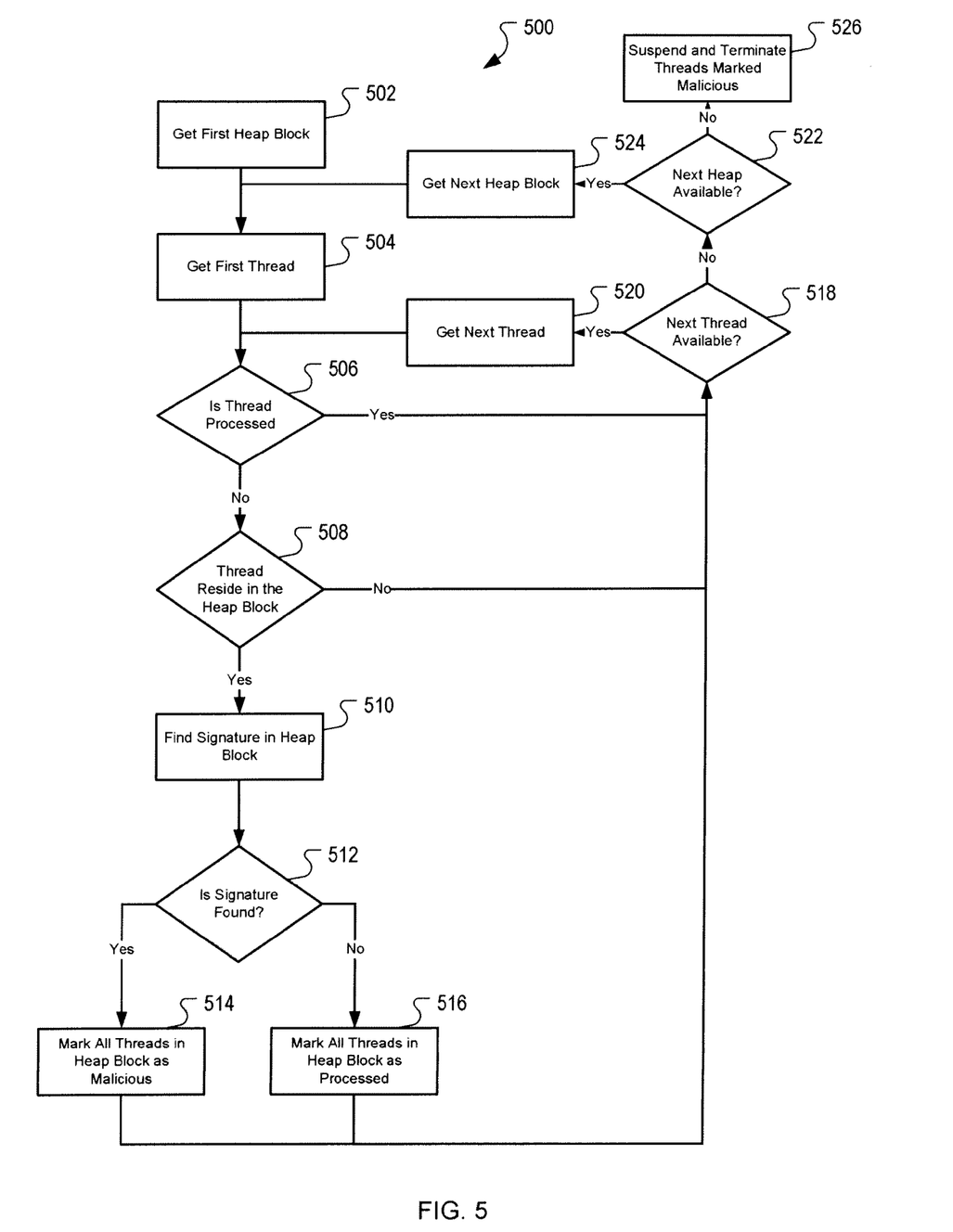
FIG. 5 is a flow diagram illustrating another example process for identifying and terminating malicious threads in a computer process.

FIG. 5 is a flow diagram illustrating another example process for identifying and terminating malicious threads in a computer process. The example process 500 can be implemented in a malware protection program, e.g., antivirus software, or embodied in software code that runs independently as a separate program with its own computer processes, services, and processes.

In general, the process 500 iterates over the memory heap blocks associated with a computer process. For each memory heap block, the process iterates over the threads in the computer process. If an unprocessed thread resides in the memory heap block, the memory heap block is compared to malware signatures. Unprocessed threads are threads that have not been marked as either processed or malicious. If the memory heap block matches any of the malware signatures then all threads which reside in the memory heap block are marked as malicious. Once all of the memory heap blocks have been processed then the threads marked as malicious are suspended and terminated.

The process 500 accesses a first memory heap block (502). The process iterates over the memory heap blocks associated with the process, as such, a first memory heap block is obtained as a start of the iteration process. The memory heap block may represent the lowest memory addresses associated with the process's memory heap.

The process 500 identifies a first thread (504). For example, a list of all threads may be obtained for a computer process, or for all computer processes, and the process 500 identifies the first thread in the list.

The process 500 determines if the thread has been processed (506). For example, the process 500 examines the thread to determine if the thread has been marked as either malicious or processed. A thread that has already been marked has had its status determined and does not need to be subsequently analyzed.

If the thread has been processed, the process 500 determines if a next thread is available (518). For example, if the process 500 determined that a thread had been processed at (506), or if a thread's start address was not in the heap block at (508), or after marking the threads at (514) or (516), the process 500 determines if there are any threads remaining to be processed.

If the thread has not been processed, the process 500 determines if the thread resides in the memory heap block (508). As discussed above with respect to process 400, the process 500 analyzes threads which have a start address within the current memory heap block.

If the thread does not reside in the memory heap block, the process 500 determines if a next thread is available (518) as discussed above.

If the thread resides in the memory heap block, the process 500 processes the memory heap block for signatures (510). As discussed above with respect to process 400, the memory heap block is analyzed to determine if any of the data stored within memory heap block matches a malicious signature.

The process 500 determines if a malicious signature is found (512). The process 500 compares the memory heap block to malicious signatures to determine if any malicious signature matches the memory heap block. If a malicious signature is found, then the process 500 marks all threads in the memory heap block as malicious and processed (514). For example, in response to determining that the memory heap block matches a malicious signature, the process 500 marks all the threads which reside in the memory heap block as malicious.

In no malicious signatures are found in the memory heap block, then the process 500 marks all threads residing in the heap block as processed (516). For example, in response to determining that the memory heap block does not match any malicious signature, the process 500 marks all of the threads that reside in the memory heap block as processed, indicating that the threads are not malicious.

The process 500 determines if a next thread is available (518) as discussed above. If there are any remaining threads to be processed, the process 500 obtains the next available thread (520), and determines if the thread has been processed (506).

If there are no more threads to be processed for the memory heap, then the process determines if there is an unprocessed memory heap block is available (522). For example, once all of the threads are processed for a particular memory heap block, the process 500 determines if there are any memory heap blocks remaining to process. If there are any memory heap blocks remaining to the processed, then the process 500 accesses the next memory heap block (524), and the first thread for that memory heap block is identified (504). Thereafter, additional steps as described above are performed.

If there are no more memory heap blocks remaining to be processed, then the process 500 suspends and terminate the threads marked malicious (526). For example, after all of the memory heap blocks have been processed, then all malicious threads (if any) have been identified. The process 500 suspends and terminates these malicious threads. Identifying and taking action on all the malicious threads at once avoids delay between suspending/terminating each malicious thread. It is possible that one malicious thread could be monitoring the other malicious thread and vice-versa. The watcher thread could re-spawn the thread which got terminated. So, by suspending all the malicious threads at once and then terminating them in quick time would avoid such cases to a large extent.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be perfoiined in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to terminate a malicious thread, the method executed by a data processing apparatus and comprising:
   identifying, in computer memory, a memory heap assigned to a particular computer process, the memory heap comprising a plurality of memory heap blocks;
   determining that a particular one of the plurality of memory heap blocks is a malicious memory heap block added by a malicious source to the memory block assigned to the particular computer process;
   identifying that one or more threads have a start address that resides within the malicious memory heap block, the one or more threads comprising a subset of a plurality of threads;
   performing an analysis on each thread in the subset of threads based on each thread in the subset having a start address within the malicious memory heap block, to determine, for each of the threads in the subset, whether the thread is a malicious thread injected into the particular computer process by malware, the analysis comprising, for each of the threads in the subset, identifying a signature for the thread and comparing the signature for the thread to signatures of known malicious threads, the particular computer process comprising a non-malicious process, and at least one of the subset of threads is a non-malicious thread of the particular computer process; and
   terminating threads in the subset of threads determined through the analysis to be malicious, where the at least one non-malicious thread is preserved.

2. The computer-implemented method of claim 1, wherein identifying threads that reside in the memory heap block comprises identifying threads which have a start address within an address range of the memory heap block.

3. The computer-implemented method of claim 1, wherein determining whether at least one of the identified threads in the memory heap block is a malicious thread comprises:
   analyzing the memory heap block for the presence of malicious threads only in response to determining that at least one of the threads resides in the memory heap block.

4. At least one non-transitory computer storage medium encoded with instructions to terminate a malicious thread, where the instructions, when executed by data processing apparatus, cause the data processing apparatus to:
   identify, in memory, a memory heap assigned to a particular computer process, the memory heap to comprise a plurality of memory heap blocks;
   determine that a particular one of the plurality of memory heap blocks is a malicious memory heap block added by a malicious source to the memory block assigned to the particular computer process;
   identify that one or more threads have a start address that resides within the malicious memory heap block, the one or more threads to comprise a subset of a plurality of threads;
   perform an analysis on each thread in the subset of threads based on each thread in the subset having a start address within the malicious memory heap block, to determine, for each of the threads in the subset, whether the thread is a malicious thread injected into the particular computer process by malware, the analysis comprising, for each of the threads in the subset, identifying a signature for the thread and comparing the signature for the thread to signatures of known malicious threads, where the particular computer process is a non-malicious process, and at least one of the subset of threads is a non-malicious thread of the particular computer process; and
   terminate threads in the subset of threads determined through the analysis to be malicious, where the at least one non-malicious thread is to be preserved.

5. The computer storage medium of claim 4, wherein identifying threads that reside in the memory heap block comprises identifying threads which have a start address within an address range of the memory heap block.

6. The computer storage medium of claim 4, wherein determining whether at least one of the identified threads in the memory heap block is a malicious thread comprises:
   analyzing the memory heap block for the presence of malicious threads only in response to determining that at least one of the threads resides in the memory heap block.

7. A system comprising:
   at least one data processing apparatus;
   at least one computer memory device; and
   protection code to terminate a malicious thread, the protection code executable by the at least one data processing apparatus to:
      identify, in memory, a memory heap assigned to a particular computer process, the memory heap comprising a plurality of memory heap blocks;
      determine that a particular one of the plurality of memory heap blocks is a malicious memory heap block added by a malicious source to the memory block assigned to the particular computer process;
      identify that one or more threads have a start address that resides within the malicious memory heap block, the one or more threads comprising a subset of a plurality of threads;
      perform an analysis on each thread in the subset of threads based on each thread in the subset having a start address within the malicious memory heap block, to determine, for each of the threads in the subset, whether the thread is a malicious thread injected into the particular computer process by malware, the analysis comprising, for each of the threads in the subset, identifying a signature for the thread and comparing the signature for the thread to signatures of known malicious threads, where the particular computer process is a non-malicious process, and at least one of the subset of threads is a non-malicious thread of the particular computer process; and
      terminate threads in the subset of threads determined through the analysis to be malicious, where the at least one non-malicious thread is to be preserved.

* * * * *